March 27, 1962 G. E. REDFIELD 3,027,111

RECORDING AND REPRODUCING APPARATUS

Filed May 29, 1958 3 Sheets-Sheet 1

INVENTOR.
GEORGE E. REDFIELD, DECEASED
BY ELLA S. NESENGER, ADMINISTRATRIX
BY Morris Rabkin
ATTORNEY March 27, 1962 G. E. REDFIELD 3,027,111

RECORDING AND REPRODUCING APPARATUS

Filed May 29, 1958 3 Sheets-Sheet 2

INVENTOR.
GEORGE E. REDFIELD, DECEASED
BY ELLA S. NESENGER, ADMINISTRATRIX
BY Morris Rabkin
ATTORNEY March 27, 1962 G. E. REDFIELD 3,027,111

RECORDING AND REPRODUCING APPARATUS

Filed May 29, 1958 3 Sheets-Sheet 3

INVENTOR.
GEORGE E. REDFIELD, DECEASED
BY ELLA S. NESENGER, ADMINISTRATRIX
BY Morris ? Rabkin
ATTORNEY 3,027,111
RECORDING AND REPRODUCING APPARATUS George E. Redfield, deceased, late of Rancocas Woods, N.J., by Ella S. Nesenger, administratrix, Browns Mills, N.J., assignor to Radio Corporation of America, a corporation of Delaware Filed May 29, 1958, Ser. No. 738,764
11 Claims. (Cl. 242—55.13)

This invention relates to recording and reproducing apparatus, and more particularly to a cartridge for carrying a reelable record medium, such as a magnetic tape record.

While a cartridge constructed in accordance with the present invention is especially suitable for carrying magnetic tape records, the invention will also be applicable in apparatus for the handling of other reelable web mediums, such as photographic film.

In magnetic recording and reproducing equipment of the type presently available, it is often necessary to thread the record medium among record driving, guiding, and transducing elements. This is inconvenient and sometimes difficult. The use of cartridges for carrying the record has been suggested. However, many of the magnetic tape record cartridges which have been designed previous to this invention have been too costly to manufacture.

Another difficulty with previous cartridges is that the record medium carried therein has the tendence to become unwound and fouled during storage and shipment. It will be appreciated that a fouled tape record cannot be properly reeled, when the cartridge is again arranged for operation in the recording or reproducing machine. Mechanisms for locking or braking the record against becoming unwound from the reels and tangled in the cartridge have been found unsuitable or excessively costly.

Briefly described, a cartridge constructed in accordance with the invention includes a generally rectangular casing. One wall of the casing is formed with recesses and openings therein of predetermined configuration adapted for cooperation with the operating elements on the recording and reproducing equipment. A pair of spools or hubs are disposed between the larger walls of the casing with the hub axes parallel to each other. The hubs are mounted in the larger walls to permit some freedom of lateral movement thereof. The record medium travels along a path between the hubs which threads through the openings and across the recesses.

A braking member is disposed within the cartridge for locking the record medium against becoming unwound from the hubs. Opposite side edges of the braking member are inclined in opposite directions. The member is disposed between the hubs for movement through the region therebetween. Thus, the inclined edges of the member engage each of the hubs and force the hubs into such intimate frictional contact with the periphery of the openings as will preclude rotation of the hubs and unwinding of the medium therefrom. The braking member may be normally biased into contact with the hubs to maintain the hubs and record stationary until the cartridge is placed in the recording and reproducing equipment.

Accordingly, it is an object of the present invention to provide an improved cartridge for carrying a reelable medium.

It is a further object of the present invention to provide a cartridge for carrying a reelable medium having improved means for preventing unwanted movement of the medium in the cartridge.

It is a still further object of the invention to provide an improved cartridge for magnetic tape records which is of lower cost and is more easily assembled than cartridges heretofore available.

The foregoing and other objects, the advantages and novel features of this invention, as well as the invention itself, both as to its organization and mode of operation, may be best understood from the following description when read in connection with the accompanying drawing in which.

Figure 1:
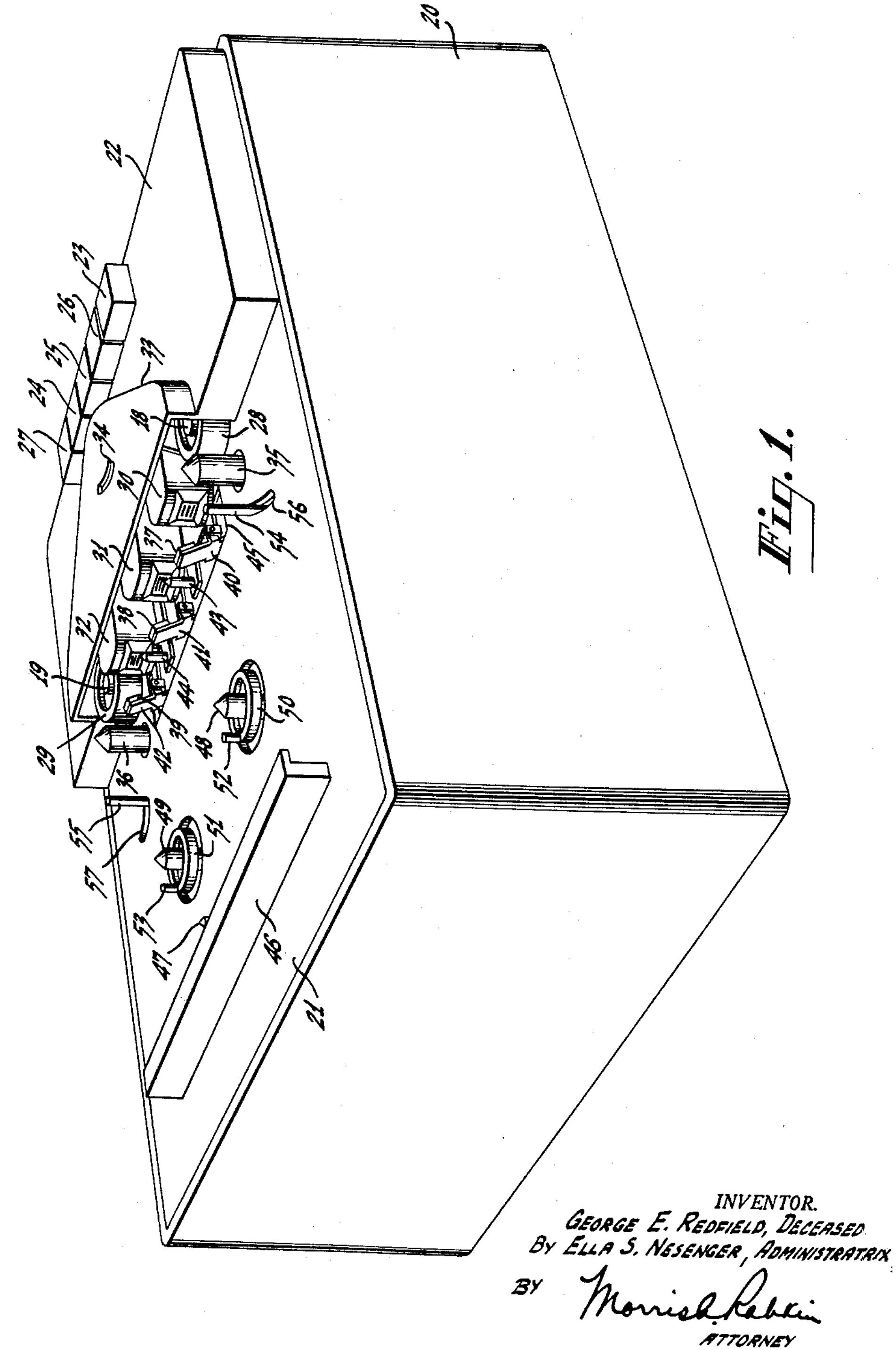
FIGURE 1 is a perspective view of a magnetic recording and reproducing apparatus for using a tape carrying cartridge constructed to incorporate features of the present invention.

In FIGURE 1, a machine is shown which is operative for magnetic tape recording and reproducing of both monaural and stereophonic sound records. This machine is sometimes designated by those skilled in the art as a tape transport mechanism. The connection of the electronic apparatus associated with the machine shown in FIGURE 1 determines whether the machine will be operative as a recorder or as a reproducer. It will be appreciated that the machine shown in FIGURE 1 may be provided with electronic apparatus which may be connected to provide the functions of magnetic recording or magnetic record reproduction. If desired, the machine may be produced incorporating simplified electronic apparatus suitable only for magnetic record reproduction. However, in most cases the machine will include electronic apparatus operable for both recording and reproduction. In such cases the equipment is commonly referred to by those skilled in the art as a magnetic recorder. Since the machine is adapted to handle and transport magnetic tape records during either recording or reproduction, the features incorporated therein will be found useful in record reproduction as well as recording equipment.

Figure 2:
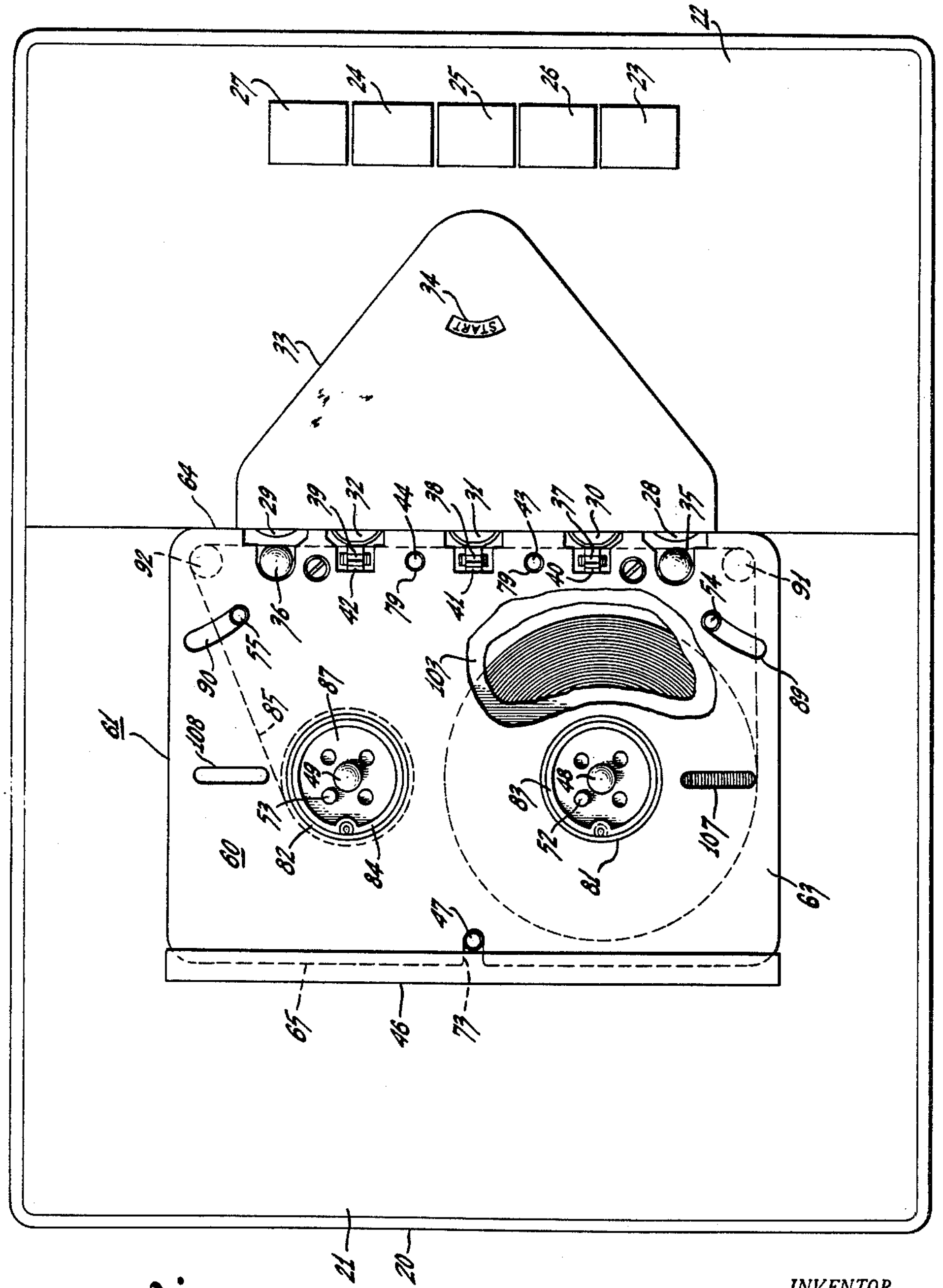
FIGURE 2 is a top view of the magnetic recording and reproducing apparatus shown in FIGURE 1 with an improved tape cartridge having features provided by the invention disposed for cooperation therewith.

The machine shown in FIGURE 1 includes a housing 20. A plate 21 provides a deck on which the tape cartridges may be placed, as shown in FIGURE 2. The plate 21 is referred to hereinafter as a tape deck 21. An escutcheon 22 is disposed on the deck. Openings are provided in the escutcheon. Push buttons 23, 24, 25, 26, and 27 extend through the openings in the escutcheon. These push buttons control the operation of the machine. Push button 23 is the "start" button. It is depressed to initiate operation of the recorder. Push button 24 is depressed when fast reeling is desired in the forward direction from left to right as viewed in FIGURE 2 when looking from the front of the deck 21 (near the push buttons). This push button 24 will be referred to as the "fast forward" button. When the machine operation is to be stopped, the button 25 is depressed. This button is, therefore, referred to as the "stop" button. Push button 26 is the reverse reeling control to achieve fast reeling from right to left as viewed in FIGURE 2. It will be referred to hereinafter as the "reverse" button. After a period of operation, it is sometimes desired to stop the recorder for a short time, and thereafter, resume operation. The push button 27 may be depressed when resumption of operation is desired. The button 27 will, therefore, be referred to as "resume" button. Thus, the stop button 25 and the resume button 27 may be depressed when it is desired to edit the material being recorded on the machine.

A pair of pressure rollers 28 and 29 of yieldable material are disposed on the tape deck 21. These rollers 28 and 29 are carried on shafts 18 and 19 which extend through the deck 21. Magnetic heads 30, 31, 32 are located between the pressure rollers 28 and 29. The pressure rollers 28 and 29 and the heads 30, 31, and 32, are partially enclosed by the raised portion 33 of the escutcheon 22. An opening 34 is formed in the raised portion 33 of the escutcheon 22. A dial (not shown in FIGURE 1) for indicating the portions of the record being scanned by the heads is located below the escutcheon 22 and may be viewed through the opening 34.

A capstan 35 is disposed adjacent the pressure roller 28 for cooperation therewith. Another capstan 36 is disposed adjacent the other pressure roller 29. The capstans 35 and 36 are rotated in opposite directions. Thus, tape drive in opposite directions may be provided by means of alternate actuation of the different pressure roller and capstan assemblies.

Pressure pads 37, 38, and 39 are adapted to cooperate with the magnetic heads 30, 31, and 32, respectively. These pressures pads 37, 38, and 39 are mounted at the ends of members 40, 41, and 42, respectively. The pad mounting members are pivotally secured to the tape deck 21 near the bottom of the heads. The pressure pads are pivoted away from the heads when it is desired to load the cartridge on the machine and during fast reeling operations.

A pair of tape guide elements 43, and 44 are disposed adjacent opposite sides of the centrally located head 31. It will be observed that an opening 45 is made in the deck 21. The pivotally mounted pressure pad support members 40, 41, and 42 extend through this opening 45 and are connected to actuation apparatus which causes the pivotal movement thereof.

Several elements are provided for cooperation with the cartridge in addition to those tape driving, guiding and transducing elements heretofore mentioned. These elements are an L-shaped backing bar 46. A pin 47, which is secured to the deck 21, is disposed near the center of the backing bar. A pair of shafts 48 and 49 extend through openings in the deck. Coupling disks 50 and 51 are mounted on the shafts 48 and 49, respectively. Coupling pins 52 and 53 are yieldably mounted on the coupling disks 50 and 51 near the periphery thereof. A pair of feeler pins 54 and 55 extend through openings 56 and 57 in the deck 21. These openings 56 and 57 are longer than the diameter of the pins 54 and 55, and the pins are reciprocally movable therein. These feeler pins 54 and 55 contact the tape and sense the tension therein. The feeler pins 54 and 55 are connected to mechanism for automatically initiating successive reeling operations in opposite directions.

Three magnetic heads are shown in FIGURE 1. The heads 30 and 32 operate as recording or reproducing heads. The head 31 operates as an erase head during recording and is made inoperative during reproduction. Two of the heads 30 and 32 have a pair of cores and are operative to record or reproduce two different record tracks on the tape. The recording and reproduction apparatus provided by the invention and illustrated in the drawings is operative to record four adjacent longitudinal record tracks on the tape. The signal gaps of the cores in each head are in alignment with each other. However, the pair of cores in one of the heads 30 is staggered laterally across the width of the tape from the pair of cores in the other head 32. The head 30 is adapted to record or reproduce the two record tracks which will be interleaved with two different record tracks which may be recorded or reproduced with the other head 32. The erase head 31 is also provided with two cores and is adapted to simultaneously or alternately erase any one or two of the tracks recorded by the heads 30 and 32. In order to select which two of the tracks is to be engaged by the core elements of the erase head 31, the erase head is mounted for lateral movement up and down, by mechanism which coordinates erase head movement with the direction of tape travel. Thus, four tracks may be recorded by means of the magnetic heads incorporated in the illustrated machine. For stereophonic recording or reproduction, any two of the tracks may be simultaneously recorded, reproduced or erased. The tracks may be recorded in one direction on two of the tracks and in the opposite direction on the other two tracks. Thus, the recording or reproduction time is doubled for stereophonic sound recording or reproduction. For monaural recording, four tracks may be recorded successively. It will be desirable to record the first track with one of the core elements of one of the heads 30. This first track may be disposed adjacent one edge of the tape. The next track may be recorded with the other head 32 during the opposite direction of tape travel. The second track may be located adjacent the opposite edge of the tape. The third track may be disposed adjacent the second track. This third track is recorded with the head 30 that recorded the first track and in the same direction on the tape as that in which the first track was recorded. The fourth track may then be recorded in the same direction as the second track by the head 32. This fourth track may be recorded between the third track and the first track. Since different ones of the heads 30 and 32 scan adjacent tracks on the tape, crosstalk between adjacent tracks is substantially reduced, and it is possible to record as many as four tracks on standard tape which is only one-quarter inch wide. The construction and features of operation of the tape transport mechanism are described in greater detail in a copending application filed in the names of Dallas R. Andrews and Elwood S. Maris on September 29, 1958, Serial No. 766,167.

In FIGURE 2, a cartridge 60 is shown mounted on the deck of the machine. The machine is disposed in the start position as indicated on the dial viewed through the opening 34. In the start position the machine is ready to receive the cartridge. As will be seen in FIGURE 2, the pressure rollers 28 and 29 are disposed away from the capstans 35 and 36. The pressure pad mounting members 40, 41, and 42 are pivoted away from the heads 30, 31, and 32. The tension feeler pins 54 are moved inwardly toward each other and away from contact with the tape. The cartridge 60 is inserted by being placed against the backing bar 46, with the pin 47 located within a notch 73, and dropped. When the cartridge is disposed in place on the machine, the pressure rollers and heads are disposed on one side of the path of tape travel in the cartridge, while the capstans and pressure pads are disposed on the opposite side of the tape.

Figure 4:
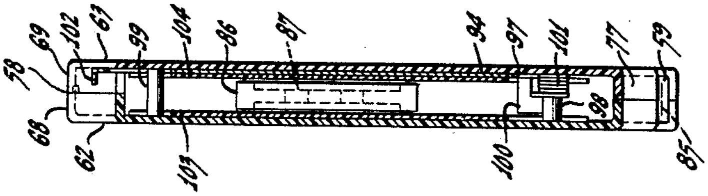
FIGURE 4 is a sectional view of FIGURE 3, the section being taken along the line 4—4 on FIGURE 3, when viewed in the direction of the arrows.
Figure 3:
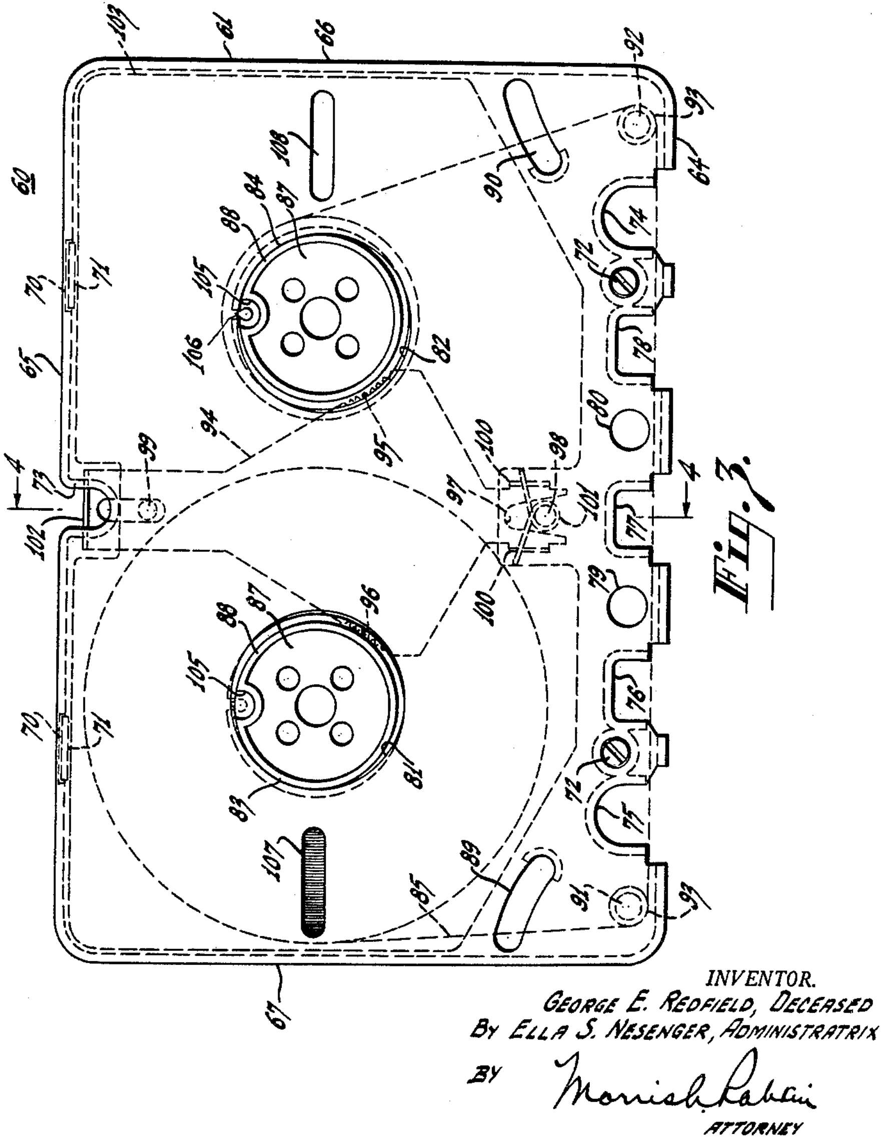
FIGURE 3 is a top view of the cartridge shown in FIGURE 2 removed from the recording and reproducing equipment.

The cartridge will be seen in greater detail in FIGURES 3 and 4. The cartridge itself is a rectangular casing 61 having wide top and bottom walls 62 and 63. The front wall 64, rear wall 65 and side walls 66 and 67 of the cartridge are quite narrow. For example, the top and bottom walls of the cartridge may be five inches wide and seven inches long. The side walls, front wall and rear wall of the cartridge may be only one-half inch high. The cartridge may be constructed of some suitable plastic material such as polystyrene. The cartridge may be formed in two half parts, 68 and 69. The junction 58 of these two parts is in the side walls, front and rear walls of the cartridge. The two half parts 68 and 69 of the cartridge are located in exact position by means of cooperating recesses 70 in the bottom part 69 and extensions 71 in the upper part 68. These recesses and extensions are located in the rear wall of the cartridge 60. Further locating recesses and cylindrical extensions are disposed around openings for screws 72 which are used to fasten together the two half parts 68 and 69 of the casing 61. The rear wall 65 of the cartridge is provided with a notch 73. This notch is located approximately in the middle of the rear wall 65. When the cartridge is inserted on the tape deck under the top of the backing wall, the locating pin 47 enters the notch 73 to properly position the cartridge 60 against the backing bar 46.

The front wall of the cartridge is provided with a plurality of recesses of predetermined configuration. The recesses 74 and 75 which are closest to the side walls are adapted to receive the capstans 35 and 36. The pressure pads mounting members 40, 41, and 42 are received by the rectangular shaped recesses 76, 77, and 78 respectively. A pair of holes 79 and 80 are located near opposite sides of the recess 77. The guide elements 43 and 44 are received within these holes 79 and 80. It will be noticed that each of the recesses 75, 76, 77, 78 and 74 are widened at their mouths. Openings are provided in the cartridge in the portions of the recesses at their enlarged mouths. One of these openings in the recess 77 is shown at 59 in FIGURE 4. It will be observed that a linear path for travel of the tape 85 extends through these openings.

A pair of openings of a circular nature are provided in the top wall 63. A similar pair of circular openings are disposed in the bottom wall 62 which are opposite to the openings in the top wall 63. A pair of hubs 83 and 84 around which the magnetic tape 85 is wound are disposed within these openings. Each hub has a web 87, a cylindrical section 88 at the periphery of the web, and a central portion 86 in the cylindrical section 88. The diameter of the cylindrical section 88 of the hubs 83 and 84 is smaller than the diameter of the openings 81 and 82 so that the hubs may move freely in a lateral direction within the opening. The central portion 86 is of enlarged diameter so that once the hubs are disposed in the cartridge they cannot fall out. A hole for receiving the shafts 48 and 49 is disposed in the center of the web 87. Four holes for receiving the coupling pins 52 and 53 are disposed around the central shaft hole. A recess 105 is provided in the cylindrical section 88 of the hubs. A pin 106 is located in the recess 105 around which the end of the tape 85 is looped to anchor the tape to the hub.

Each of the top and bottom walls of the cartridge has opposed elliptically shaped openings 89 and 90 through which the feeler pins 54 and 55 extend. The tape 85 traverses a path over the feeler pins and around a pair of guides 91 and 92 which are formed in the cartridge. These guides may be surrounded by smooth metal collars 93 for reducing the friction between the guides and the tape as the tape passes over the guides. The tape 85 extends between the guides 91 and 92 along the linear path threaded through the openings at the mouths of the recesses 75, 76, 77, 78, and 74 and across the recesses. It will be observed that when the cartridge is disposed in place on the machine, the tape will enter between the separated pressure rollers and capstans and the separated pressure pads and heads, since the linear path among these elements coincides with the path of tape travel established in the cartridge. Thus, automatic and convenient loading of the cartridge in the machine is obtained.

Means are provided for braking and locking the reel hubs 83 and 84 against rotation so that the tape will not unwind and become tangled within the cartridge. It will be appreciated that the hubs 83 and 84 are loosely disposed within the openings 81 and 82. Upon turning of these hubs, the tape is released and may become folded and tangled within the cartridge. Without the braking means, tape from one of the hubs may wind around the other hub. Thus, if the cartridge were inserted in the machine for operation and tape reeling started, it would be possible to extensively damage the tape.

To eliminate these difficulties, there is provided a braking or locking member 94 for the hubs. This member is illustrated as being a thin plate of metal, such as aluminum. If desired, a recess may be formed in the wall 63 of the cartridge into which the plate member 94 may be inserted. The member is located between the hubs 83 and 84 for lateral movement in a direction from the front wall 64 of the cartridge to the rear wall 65 thereof. It will be noted that the braking member 94 has inclined edges which are adapted to engage the periphery of each of the hubs 83 and 84. Portions 95 and 96 of these inclined edges are serrated. The end of the member 94 nearest the front wall 64 of the cartridge is notched. The notch 97 is adapted to receive a post 98 which is upstanding from the wall 63 of the cartridge. The post 98 together with another upstanding post 99 positions the braking member 94 in the aforesaid location between the hubs for movement back and forth between the front wall and rear wall of the cartridge. It should be noted that the diameter of the post 98 is much smaller than the width of the notch 97 so that the member 94 has a measure of freedom of motion from side to side in a direction between the walls 66 and 67. An opening in the rear end of the member is adapted to receive the post 99.

The front end of the member 94 is provided with projections 100, disposed parallel to the side walls 66 and 67, as shown in the drawing. A hairpin type coil spring 101 is wound around the post 98. The ends of the spring fit into notches in the projections 100. The member 94 is, therefore, biased toward the rear wall 65 of the cartridge 60, thus bringing the serrated edges 95 and 96 into contact with the peripheries of the hubs 83 and 84. A projection 102 extends parallel to the rear wall 65 of the cartridge 60 from the rear end of the braking member 94. This projection 102 is adapted to be engaged by the locating pin 47 on the tape deck 21 so as to force the braking member towards the front wall 64 and out of engagement with the hubs.

In operation, the inclined edges of braking member 94 are in engagement with the peripheries of the hubs 83 and 84 at the serrated portions 95 and 96, when the cartridge 60 is removed from the machine for storage. It will be observed that those portions of the peripheries of the hubs 83 and 84 which are diametrically opposite from the portions of the hubs which engage the serrated edges 95 and 96 of the member 94 are gently urged into contact with the inner periphery of the holes 81 and 82. Thus, each of the hubs 83 and 84 is kept from rotating to unwind tape by reason of peripheral frictional contact at two points thereon. This two-point peripheral contact provides the further feature of jamming the hubs in the holes 81 and 82 so that they cannot move in the direction to unwind tape therefrom. However, the hubs may undergo limited rotation in a direction to wind the tape thereon. This feature is desirable since it is important to maintain tension in the tape. If no tension was maintained in the tape, the tape might become loose along its path of travel through the holes and across the recesses 75, 76, 77, 78, and 74 in the front wall 64 of the cartridge. Thus, the tape may be caught accidentally on some foreign object external to the cartridge and broken. Alternatively, the tape may be easily crushed when it is stored in a compartment adjacent a wall or other non-yieldable objects.

This jamming action results because the component of force applied to the hubs by the inclined edges of the braking member wedges the hubs between the braking member 94 and the periphery of the wall at each of the holes 82 and 81. When the hubs turn in a clockwise direction for the hub 83 and in a counterclockwise direction for the hub 84, such rotation tends to pivot the braking member 94 for side-to-side movement about the post 99, which is located near the rear end of the member 94. The hubs may then rotate in a direction to wind tape thereon. However, the hubs become jammed in the holes when they rotate in a direction to unwind tape therefrom.

It will be noticed that the locking mechanism comprises merely the single member 94 and the spring 101. This is a construction of lowest possible cost. Moreover, the braking and locking action is highly efficient. This construction has the additional advantage of applying equal braking forces to each of the reels, since the member 94 is disposed between the hubs 83 and 84. The tapered, enlarged notch 97 permits the member 94 to swing or shift slightly from side to side to apply equal braking forces to each of the hubs. This equalizes wear on the hubs and, therefore, increases the life expectancy of the cartridge over the life of such mechanisms as apply forces to one of two reels. It should be noted that the projections 100 and 102 are slightly shorter than the internal height of the cartridge. This prevents the braking member from moving in a vertical direction and maintains it properly positioned upon the wall 63 thereof.

Means are provided for preventing the magnetic tape from binding within the cartridge. These means have the further feature of guiding the tape through the cartridge between the top and bottom walls 62 and 63 thereof so as to make it unnecessary for any drag tension to be applied to the hubs from which the tape is being unreeled. This latter feature simplifies the tape driving mechanism since it eliminates the need for any clutch arrangement in the hub drives. Another feature of the means for preventing binding of the tape within the cartridge is that annoying squealing sounds which might result from the variable coefficient of sliding friction between the tape and the walls of the cartridge are eliminated.

It will be appreciated that the cartridge is manufactured from plastic material, such as polystyrene. The magnetic tape which will be used with the normal standard tape cartridge may be standard magnetic tape comprising a base of cellulose acetate film which is coated with some retentive magnetic material, usually a hard iron oxide. This tape will be in edge contact with the plastic walls of the cartridge. The magnetic oxide is an abrasive material. It has been found that there is a high coefficient of friction between the tape and the material of the cartridge. Thus, when the tape slides over the cartridge sufficient heat is generated to melt the internal walls of the cartridge and to form grooves therein, such grooves cause the tape to tilt and not travel properly between the walls of the cartridge. Moreover, the coefficient of sliding friction varies such as to cause annoying squeals and screeches as the tape slides over the walls.

All of the foregoing difficulties are obviated by reason of the inclusion of liners adjacent the walls 62 and 63 of the cartridge 60. These liners may be sheets 103 and 104 of plastic material, such as Mylar, having predetermined properties. Mylar is a trade name for a saturated polyester resin. The nature and characteristics of Mylar are explained in an article entitled, "Polyester Resins," appearing in Modern Plastics, Encyclopaedia Issue for September 1954. The sheets 103 and 104 are formed to cover the portions of the walls 62 and 63 on which the reeled tape rests. The largest amount of sliding contact occurs at the large areas of reeled tape around the hubs 83 and 84, as the hubs rotate. The liners 103 and 104 are disposed between the bottom edge of the tape and the walls of the cartridge. It will be observed that the bottom sheet 104 also serves to cover the braking member 94 and facilitate its sliding motion on the bottom wall 63 of the cartridge. The sheets serve the additional function of closing the cartridge against introduction of dust and foreign elements through a pair of viewing openings 107 and 108. The quantity of tape remaining on the hubs and the amount of reeling time remaining for tape travel in any direction may be observed by peering through these viewing openings 107 and 108. A pair of the viewing openings 107 and 108 may be disposed in each of the walls 62 or 63 of the cartridge so that the tape may be viewed although the cartridge is turned over on the machine.

The addition of the sheet liners 103 and 104 provides the additional features of guiding the tape between the top and bottom walls of the cartridge and providing sufficient tension in the tape to eliminate the need for drag tensioning means on the hubs. A film of air providing an air cushion will be formed between the sheets and their adjacent walls of the cartridge. This cushion of air in combination with the sheet provides a damper for properly and smoothly retarding the movement of the tape in a transverse direction between the upper and lower walls of the cartridge 62 and 63. This air cushion also functions to acoustically damp any sound and vibration of the tape as it slides over the walls of the cartridge and over the liners. This sound damping provides additional means for eliminating any noise in the cartridge. Squeals due to variable coefficient of friction are eliminated by the characteristics of the liners themselves.

The characteristic of the liners which provides yieldable pressure and drag on the tape as it moves has the additional feature of eliminating jitter, wow and flutter in the tape because all erratic tape motions are damped by reason of the air cushion between the liner and the wall of the cartridge. It may be desired to increase the drag provided on the tape by the liner. This may be accomplished by pressing the liner sheet in a die to impress waves in the sheets 103 and 104. This may be accomplished by the die having waves formed therein. The die may be heated while the liner sheet is located therein.

While Mylar material has been found suitable as a liner sheet, any sheet material having the characteristics of low coefficient of friction with the tape and high melting temperature at microscopic depths will be suitable. It is to be noted that any hard material may not be sufficient. If the material is too hard, the annoying squeals and sounds due to the variable coefficient of sliding friction will be increased. Moreover, the heat developed, while not sufficient to melt the material of the cartridge, may be sufficient to damage the tape.

The liners 103 and 104 make it unnecessary to provide the hubs with flanges to eliminate the adverse effects of sliding friction. Thus, the amount of tape that may be carried by the cartridge is increased by a considerable amount. More than one-half of the capacity of the cartridge would be lost if flanges were used. Thus, the use of a liner has the additional feature of increasing the tape carrying capacity of the cartridge.

What is claimed is:

1. In apparatus for reeling a flexible web between a pair of reeling members mounted for rotation on a support, a mechanism for locking said reeling members against rotation on said support including a braking element movably mounted on said support, and means for shifting said element into contact with both of said reeling members for shifting said reeling members in their mountings into frictional engagement with said support whereby said reeling members and said support are in braking relationship with each other.

2. Apparatus for carrying a web medium comprising a support plate having spaced openings therein, a pair of hubs between which said medium is reelable, each of said hubs having a portion thereof disposed in said openings for rotation therein and movable into braking position in engagement with the periphery of said opening, and a braking member having opposite side edges inclined with respect to each other, said braking member being disposed on said support plate with said inclined edges facing the peripheries of different ones of said hubs, said braking member being movable between said hubs for moving said hubs into said braking position and for advancing said edges into braking relationship with said hubs.

3. Apparatus according to claim 2 wherein portions of said side edges adapted to contact said hubs are serrated.

4. Apparatus for carrying a web medium which is reelable between adjacent hubs around which said medium is adapted to be wound comprising a member in which said hubs are journalled for rotation, and hub braking means including another member movable with respect to said first named member into contact with said hubs for forcing said hubs into frictional braking engagement with said first named member at their journals therein.

5. The combination with a cartridge for carrying a record medium including a casing having a plurality of oppositely disposed walls and openings in at least one of said walls, said casing also including hubs between which said medium is adapted to be reeled, said hubs being disposed for rotation in said openings, said combination comprising a member for locking said hubs against rotation, said member having edge portions adapted to engage said hubs by contact along the periphery thereof for advancing said hubs into peripheral braking engagement with said casing at said openings, and said member being mounted in said casing for movement between a pair of said opposite walls thereof for advancing said edge into contact with said hub periphery when moved toward one of said opposite walls and for retracting said edge from said hub periphery when moved toward the other of said opposite walls to release said hubs for rotation.

6. Apparatus for carrying a reelable record medium comprising a support plate having a pair of circular openings spaced from each other, a pair of hubs having cylindrical extensions disposed in said openings for rotation therein, said medium being reelable between said hubs, the diameter of said openings being greater than the diameter of said extensions so that said hubs are shiftable in said openings, and a braking member slidably mounted on said support plate for movement between said hubs in a direction transverse to a line between said hubs, said braking member having inclined side edges disposed for peripheral contact with said hubs to shift said hubs in opposite directions into frictional braking engagement with the edges of said support plate at said openings.

7. Apparatus for carrying a flexible, elongated record medium comprising a support member having a pair of spaced circular openings therein, a pair of hubs between which said medium is adapted to be reeled having cylindrical extensions disposed in said openings for rotation therein, said hubs being movable into braking position in engagement with the peripheries of said openings, said openings being of greater diameter than said hub extensions so that said hubs are shiftable therein, a brake plate slidably mounted on said support member for movement between said hubs, said plate having side edges inclined relative each other, the dimensions of said plate between said side edges being greatest near one end of said plate, said greatest dimension of said plate between said side edges thereof being greater than the distance between said openings, a projection extending from said support member near said one end of said plate around which said plate is shiftable sidewise, and means operative upon said one end of said plate for urging said plate for movement along said support member between said hubs for bringing said inclined inside edges into contact with said hubs to move said hubs into said braking position.

8. A cartridge for carrying a magnetic tape record comprising a casing having a top wall, bottom wall, side walls, front walls and rear walls, said top and bottom walls having two pairs of aligned circular openings therein, a pair of hubs disposed in said cartridge, each of said hubs having cylindrical extensions of reduced diameter disposed in said openings, said openings having diameter intermediate the diameter of said hubs and said cylindrical extensions so that said hubs are rotatable and laterally shiftable in said openings, said tape being reelable in said cartridge between said hubs upon rotation thereof, a brake plate disposed between said hubs on one of said top and bottom walls, said plate having a tapered portion between the front and rear ends thereof, said tapered portion having its largest dimension greater than the distance between said hubs, said front end of said brake plate being disposed adjacent said front wall, said rear end of said brake plate being disposed adjacent said rear wall, said portion of largest dimension being located near said front end wall, said rear end having an opening therein, a projection extending through said opening from one of said top and bottom walls, said front end of said brake plate having a tapered notch therein, another projection extending through said notch from said end wall, a pair of upstanding projections on said brake plate near said front end thereof, and a hairpin spring around said other projection having the opposite ends thereof bearing against different ones of said upstanding projections to bias said plate towards said rear wall into side edge contact with the cylindrical extensions of said hubs and for sidewise pivotal movement limited by the dimensions of said tapered notch around said first named projection.

9. A cartridge for carrying a reelable tape which comprises at least one spool around which said tape is adapted to be reeled, a casing having a hole therein for receiving said spool for rotation, said hole having a larger diameter than the portion of said spool disposed therein whereby said spool is shiftable within said hole, a movable member having an elongated side inclined with respect to the direction of movement of said member and adapted to engage said spool upon movement of said member from a first position to a second position, and means for biasing said member toward said second position for engaging said spool to shift said spool into frictional braking engagement with the periphery of said hole and confine said spool between said side and said hole periphery whereby to restrain said spool from rotation.

10. A cartridge for carrying a reelable tape which comprises a pair of spools around and between which said tape is adapted to be reeled, a casing having a pair of spaced openings, said spools being freely disposed individually in different ones of said openings for rotation therein, and a wedge-shaped member movable within said casing between said openings into engagement with said spools for wedging said spools against the peripheries of said openings to restrain said spools from rotation.

11. A cartridge for carrying a reelable tape which comprises a pair of spools around and between which said tape is adapted to be reeled, a casing having a pair of openings in each of which a different one of said spools is journalled for rotation, said spools being shiftable within said openings, a member in said casing movable in a direction transverse to a line extending between said openings, said member having elongated sides inclined away from each other toward said openings, said sides being engageable with said spools when said member moves between said openings to shift and wedge said spools against the peripheries of said openings.

References Cited in the file of this patent

UNITED STATES PATENTS

| | | |
|---|---|---|
| 2,295,503 | Miller | Sept. 8, 1942 |
| 2,408,320 | Kuhlik | Sept. 24, 1946 |
| 2,499,895 | Walker | Mar. 7, 1950 |
| 2,661,162 | Owens | Dec. 1, 1953 |
| 2,793,039 | Hironimus | May 21, 1957 |
| 2,804,508 | Mastling et al. | Aug. 27, 1957 |
| 2,868,471 | Klein | Jan. 13, 1959 |